(12) United States Patent
Harada (10) Patent No.: US 11,541,464 B2
(45) Date of Patent: Jan. 3, 2023

(54) METHOD FOR MANUFACTURING DIAMOND SINGLE CRYSTAL CUTTING TOOL USING LASER PULSES

(71) Applicant: Sumitomo Electric Hardmetal Corp., Itami (JP)

(72) Inventor: Gaku Harada, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 671 days.

(21) Appl. No.: 16/499,049

(22) PCT Filed: Jan. 10, 2018

(86) PCT No.: PCT/JP2018/000265
§ 371 (c)(1),
(2) Date: Sep. 27, 2019

(87) PCT Pub. No.: WO2018/179666
PCT Pub. Date: Oct. 4, 2018

(65) Prior Publication Data
US 2020/0030889 A1     Jan. 30, 2020

(30) Foreign Application Priority Data

Mar. 28, 2017 (JP) .............................. JP2017-063199

(51) Int. Cl.
*B23B 27/20*     (2006.01)
*B23K 26/361*     (2014.01)
(Continued)

(52) U.S. Cl.
CPC .......... *B23B 27/20* (2013.01); *B23K 26/0624* (2015.10); *B23K 26/361* (2015.10);
(Continued)

(58) Field of Classification Search
CPC ................ B23B 27/20; B23B 2226/31; B23B 2260/092; B23K 26/0624; B23K 26/361;
(Continued)

(56) References Cited

U.S. PATENT DOCUMENTS 5,133,332 A * 7/1992 Tanaka .................. B23B 27/005
51/293
5,178,645 A    1/1993 Nakamura et al.
(Continued)

FOREIGN PATENT DOCUMENTS

EP     0 720 887 A1    7/1996
JP     3-228504 A     10/1991
(Continued)

*Primary Examiner* — John P. Dulka
(74) *Attorney, Agent, or Firm* — Baker Botts L.L.P.; Michael A. Sartori (57) ABSTRACT

A method for manufacturing a cutting tool according to one embodiment is a method for manufacturing a cutting tool, the cutting tool including a base material and a diamond single crystal material fixed to the base material, the diamond single crystal material having a rake face, a flank face continuous with the rake face, and a cutting edge formed by a ridgeline serving as a boundary between the rake face and the flank face. The method for manufacturing a cutting tool according to one form of the present disclosure includes a flank face irradiation step of applying a laser to the diamond single crystal material along the cutting edge from a side of the flank face. The laser has a pulse width of $1\times10^{-12}$ seconds or less and a peak output of less than 1 W in the flank face irradiation step.

8 Claims, 4 Drawing Sheets

(51) Int. Cl.
    *B23K 26/38*         (2014.01)
    *B23K 26/0622*    (2014.01)
    *B23K 26/40*         (2014.01)
    *B23K 26/53*         (2014.01)
    *B23K 101/20*       (2006.01)
    *B23P 15/28*         (2006.01)
    *B23K 103/00*       (2006.01)

(52) U.S. Cl.
    CPC .............. *B23K 26/38* (2013.01); *B23K 26/40* (2013.01); *B23K 26/53* (2015.10); *B23B 2226/31* (2013.01); *B23B 2260/092* (2013.01); *B23K 2101/20* (2018.08); *B23K 2103/30* (2018.08); *B23P 15/28* (2013.01)

(58) Field of Classification Search
    CPC ........ B23K 26/38; B23K 26/40; B23K 26/53; B23K 2101/20; B23K 2103/30; B23P 15/28
    See application file for complete search history.

(56) References Cited

U.S. PATENT DOCUMENTS

| | | |
|---|---|---|
| 6,246,026 B1 | 6/2001 | Vergeest |
| 2009/0317617 A1 | 12/2009 | Sato et al. |
| 2015/0176155 A1 | 6/2015 | Ueda et al. |

FOREIGN PATENT DOCUMENTS

| | | |
|---|---|---|
| JP | H04-193406 A | 7/1992 |
| JP | 2001-124932 A | 5/2001 |
| JP | 2007-216327 A | 8/2007 |
| JP | 2008-229838 A | 10/2008 |
| JP | 2009-066627 A | 4/2009 |
| JP | 2010-003853 A | 1/2010 |
| JP | 2010-023192 A | 2/2010 |
| JP | 2010-036296 A | 2/2010 |
| JP | 2016-203372 A | 12/2016 |
| WO | 2014/003110 A1 | 1/2014 |

* cited by examiner

METHOD FOR MANUFACTURING DIAMOND SINGLE CRYSTAL CUTTING TOOL USING LASER PULSES

TECHNICAL FIELD

The present disclosure relates to a method for manufacturing a cutting tool. The present application claims priority to Japanese Patent Application No. 2017-063199 filed on Mar. 28, 2017, the entire contents of which are incorporated herein by reference.

BACKGROUND ART

Japanese Patent Laying-Open No. 2016-203372 (PTL 1) describes a method for forming a cutting edge and a flank face of a cutting tool by applying a laser to a cutting insert blank fixed to a cutting insert support. In the method described in PTL 1, the cutting insert blank may be formed of single crystal diamond.

CITATION LIST

Patent Literature
  PTL 1: Japanese Patent Laying-Open No. 2016-203372

SUMMARY OF INVENTION

A method for manufacturing a cutting tool according to a first form of the present disclosure is a method for manufacturing a cutting tool including a base material and a diamond single crystal material fixed to the base material. The diamond single crystal material has a rake face, a flank face continuous with the rake face, and a cutting edge formed by a ridgeline serving as a boundary between the rake face and the flank face. The method for manufacturing a cutting tool according to the first form of the present disclosure includes a flank face irradiation step of applying a laser to the diamond single crystal material along the cutting edge from a side of the flank face. The laser has a pulse width of $1 \times 10^{-12}$ seconds or less and a peak output of less than 1 W in the flank face irradiation step.

A method for manufacturing a cutting tool according to a second form of the present disclosure is a method for manufacturing a cutting tool including a base material and a diamond single crystal material fixed to the base material. The diamond single crystal material has a rake face, a flank face continuous with the rake face, and a cutting edge formed by a ridgeline serving as a boundary between the rake face and the flank face. The method for manufacturing a cutting tool according to the second form of the present disclosure includes a cutting edge forming step of forming the cutting edge by applying a laser to the diamond single crystal material from a side of a face opposite to the rake face. The laser has a pulse width of $1 \times 10^{-12}$ seconds or less in the cutting edge forming step.

DETAILED DESCRIPTION

[Problem to be Solved by the Present Disclosure]

Single crystal diamond has lower laser absorptivity than a polycrystalline diamond sintered material including a binder. When performing laser machining on a cutting insert blank formed of single crystal diamond, there is a risk of cracking or chipping remaining in the single crystal diamond due to its low laser absorptivity. Fracture of the single crystal diamond proceeds rapidly, starting from such cracking or chipping. The method described in PTL 1, however, does not take any measures against such cracking or chipping.

The present disclosure has been made in view of the problem with conventional techniques as described above. More specifically, the present disclosure provides a method for manufacturing a cutting tool, capable of preventing cracking or chipping from remaining in a diamond single crystal material after laser machining.

[Advantageous Effect of the Present Disclosure]

According to a method for manufacturing a cutting tool in accordance with a first form of the present disclosure, cracking or chipping can be prevented from remaining in a diamond single crystal material after laser machining. According to a method for manufacturing a cutting tool in accordance with a second form of the present disclosure, cracking or chipping can be prevented from remaining in a diamond single crystal material after laser machining.

[Description of Embodiment of the Present Disclosure]

First, an embodiment of the present disclosure will be listed and described.

(1) A method for manufacturing a cutting tool according to a first form of the present disclosure is a method for manufacturing a cutting tool including a base material and a diamond single crystal material fixed to the base material. The diamond single crystal material has a rake face, a flank face continuous with the rake face, and a cutting edge formed by a ridgeline serving as a boundary between the rake face and the flank face. The method for manufacturing a cutting tool according to the first form of the present disclosure includes a flank face irradiation step of applying a laser to the diamond single crystal material along the cutting edge from a side of the flank face. The laser has a pulse width of $1 \times 10^{-12}$ seconds or less and a peak output of less than 1 W in the flank face irradiation step.

According to the method for manufacturing a cutting tool of (1) above, cracking or chipping can be prevented from remaining in the diamond single crystal material after the laser machining.

(2) in the method for manufacturing a cutting tool of (1) above, the diamond single crystal material may contain less than 600 ppm of an impurity.

According to the method for manufacturing a cutting tool of (2) above, cracking or chipping of the diamond single crystal material starting from the impurity associated with the laser machining can be suppressed.

(3) In the method for manufacturing a cutting tool of (2) above, the impurity may be nitrogen. Nitrogen concentration in the diamond single crystal material may be 20 ppm or more and 70 ppm or less.

According to the cutting tool of (3) above, fracture resistance and wear resistance of the diamond single crystal material can be improved, while cracking or chipping is prevented from remaining in the diamond single crystal material after the laser machining.

(4) The method for manufacturing a cutting tool of (1) to (3) above may further include a cutting edge forming step of forming the cutting edge by applying a laser to the diamond single crystal material from a side of a face opposite to the rake face. The laser may have a pulse width of $1\times10^{-12}$ seconds or less in the cutting edge forming step.

According to the method for manufacturing a cutting tool of (4) above, cleavage of the diamond single crystal material after the laser machining can be further suppressed.

(5) The method for manufacturing a cutting tool of (1) to (4) above may further include a fixing step of fixing the diamond single crystal material to the base material. The fixing step may be performed prior to the flank face irradiation step. According to the method for manufacturing a cutting tool of (5) above, the cutting edge can be formed with high accuracy.

(6) In the method for manufacturing a cutting tool of (1) to (5) above, the rake face may be formed of a {100} plane of the diamond single crystal material. An application direction of the laser in the flank face irradiation step and the rake face may form an angle of −52° or inure and 52° or less.

According to the method for manufacturing a cutting tool of (6) above, cleavage of the diamond single crystal material after the laser machining can be suppressed.

(7) In the method for manufacturing a cutting tool of (1) to (5) above, the rake face may be formed of a {110} plane of the diamond single crystal material. An application direction of the laser in the flank face irradiation step and the rake face may form an angle of −35° or more and 35° or less, −89° or more and −38° or less, or 38° or more and 89° or less.

According to the method for manufacturing a cutting tool of (7) above, cleavage of the diamond single crystal material after the laser machining can be suppressed.

(8) A method for manufacturing a cutting tool according to a second form of the present disclosure is a method for manufacturing a cutting tool including a base material and a diamond single crystal material fixed to the base material. The diamond single crystal material has a rake face, a flank face continuous with the rake face, and a cutting edge formed by a ridgeline serving as a boundary between the rake face and the flank face. The method for manufacturing a cutting tool according to the second form of the present disclosure includes a cutting edge forming step of forming the cutting edge by applying a laser to the diamond single crystal material from a side of a face opposite to the rake face. The laser has a pulse width of $1\times10^{-12}$ seconds or less in the cutting edge forming step.

According to the method for manufacturing a cutting tool of (8) above, cracking or chipping can be prevented from remaining in the diamond single crystal material after the laser machining.

[Details of Embodiment of the Present Disclosure]

Next, the details of the embodiment of the present disclosure will be described with reference to the drawings. It should be noted that the same or corresponding parts are designated by the same symbols in the drawings. In addition, at least portions of the embodiment described below may be combined in any manner.

(Structure of Cutting Tool According to Embodiment)

The structure of a cutting tool according to the embodiment is now described.

Figure 1:
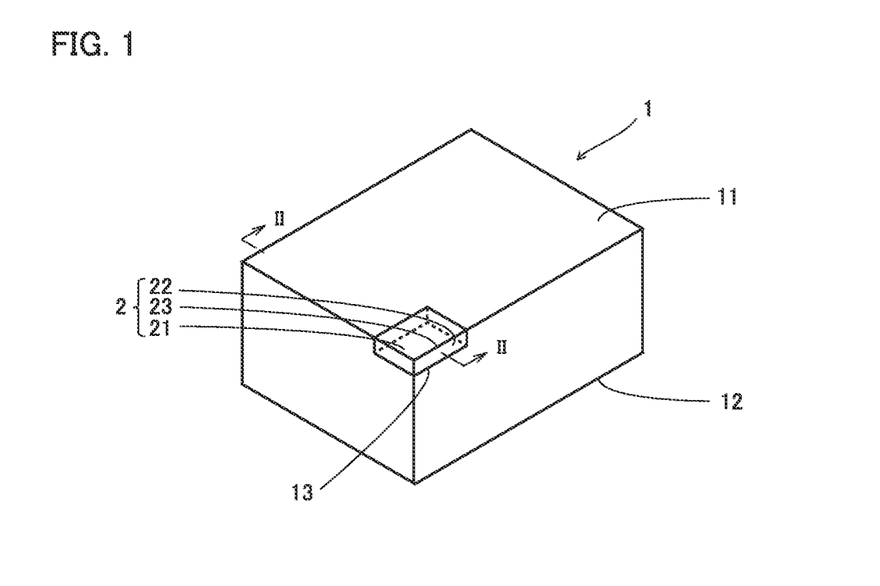
FIG. 1 is a perspective view of a cutting tool according to an embodiment.

FIG. 1 is a perspective view of the cutting tool according to the embodiment.

Figure 2:
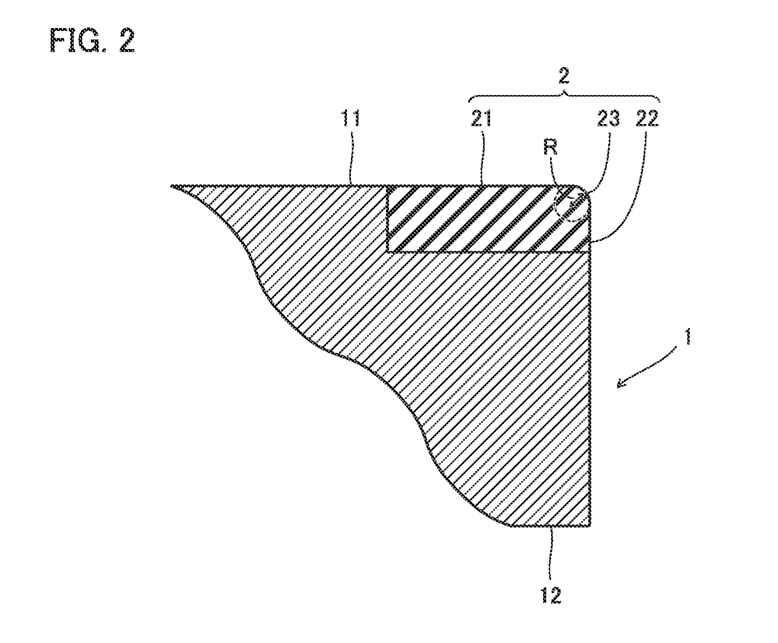
FIG. 2 is a cross-sectional view taken along II-II in FIG. 1.

FIG. 2 is a cross-sectional view taken along II-II in FIG. 1. As shown in FIGS. 1 and 2, the cutting tool according to the embodiment has a base material 1 and a diamond single crystal material 2.

Base material 1 has a top surface 11 and a rear surface 12. Rear surface 12 is a surface opposite to top surface 11. Top surface 11 is provided with an attachment portion 13. Attachment portion 13 is provided at a corner of base material 1. At attachment portion 13, top surface 11 is stepped in a direction from top surface 11 to rear surface 12.

Base material 1 is formed of cemented carbide, for example. However, the material forming base material 1 is not limited thereto. Base material 1 may be formed of high-speed steel, or may be formed of a cermet, ceramics, or the like.

Diamond single crystal material 2 has a rake face 21, a flank face 22, and a cutting edge 23. Flank face 22 is continuous with rake face 21. Cutting edge 23 is formed by a ridgeline serving as a boundary between rake face 21 and flank face 22. Diamond single crystal material 2 is fixed to base material 1. More specifically, diamond single crystal material 2 is fixed, at its face opposite to rake face 21, to top surface 11 of base material 1. Further more specifically, diamond single crystal material 2 is fixed to attachment portion 13 of base material 1.

Rake face 21 is preferably formed of a {100} plane of diamond single crystal material 2. Rake face 21 is preferably formed of a {110} plane of diamond single crystal material 2. It should be noted that the {100} plane refers to all crystal planes equivalent to a (100) plane of diamond crystal, and the {110} plane refers to all crystal planes equivalent to a (110) plane of diamond crystal.

Cutting edge 23 has a radius of curvature R. Radius of curvature R is preferably 5 μm or less. Radius of curvature R is preferably 2 μm or less.

Flank face 22 adjacent to cutting edge 23 preferably has an arithmetic average roughness Ra of 0.035 μm or less. It should be noted that arithmetic average roughness Ra is measured with a laser displacement meter.

Diamond single crystal material 2 is only required to be formed of single crystal of diamond, and may be formed in any manner. For example, diamond single crystal material 2 may be formed by CVD (Chemical Vapor Deposition) or an HPHT (High Pressure High Temperature) process.

Diamond single crystal material 2 may contain an impurity. The content of the impurity in diamond single crystal material 2 is preferably less than 600 ppm, impurity concentration in diamond single crystal material 2 is measured by SIMS (Secondary Ion Mass Spectrometry). The impurity contained in diamond single crystal material 2 may be an impurity that provides conductivity to diamond single crystal material 2, or an impurity that does not provide conductivity to diamond single crystal material 2. Examples of the impurity that provides conductivity to diamond single crystal material 2 include boron. Examples of the impurity that does not provide conductivity to diamond single crystal material 2 include nitrogen.

When the impurity contained in diamond single crystal material 2 is nitrogen, nitrogen concentration in diamond single crystal material 2 is preferably 20 ppm or more and 70 ppm or less.

(Method for Manufacturing Cutting Tool According to Embodiment)

A method for manufacturing the cutting tool according to the embodiment is now described.

Figure 3:
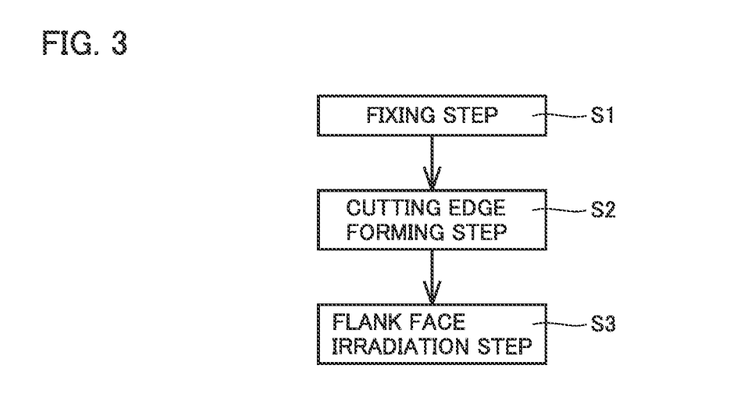
FIG. 3 is a procedure diagram showing a method for manufacturing the cutting tool according to the embodiment.

FIG. 3 is a procedure diagram showing the method for manufacturing the cutting tool according to the embodiment. As shown in FIG. 3, the method for manufacturing the cutting tool according to the embodiment has a fixing step S1, a cutting edge forming step S2, and a flank face irradiation step S3. With the object of improving dimensional accuracy of cutting edge 23 relative to base material 1, fixing step S1 is preferably performed prior to cutting edge forming step S2 and flank face irradiation step S3.

Figure 4:
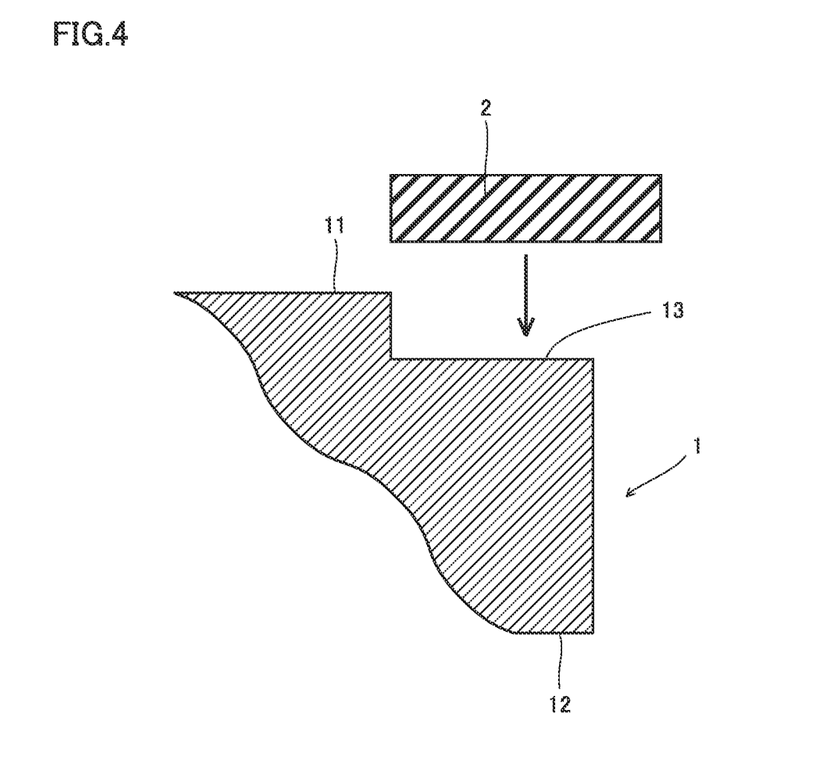
FIG. 4 is a cross-sectional view of the cutting tool according to the embodiment in a fixing step S1.

FIG. 4 is a cross-sectional view of the cutting tool according to the embodiment in fixing step S1. As shown in FIG. 4, in fixing step S1, diamond single crystal material 2 is fixed to attachment portion 13 of base material 1. The fixation of diamond single crystal material 2 to base material 1 is carried out by brazing, for example. However, the method for fixing diamond single crystal material 2 to base material 1 is not limited thereto, and other fixing methods can also be employed.

Figure 5:
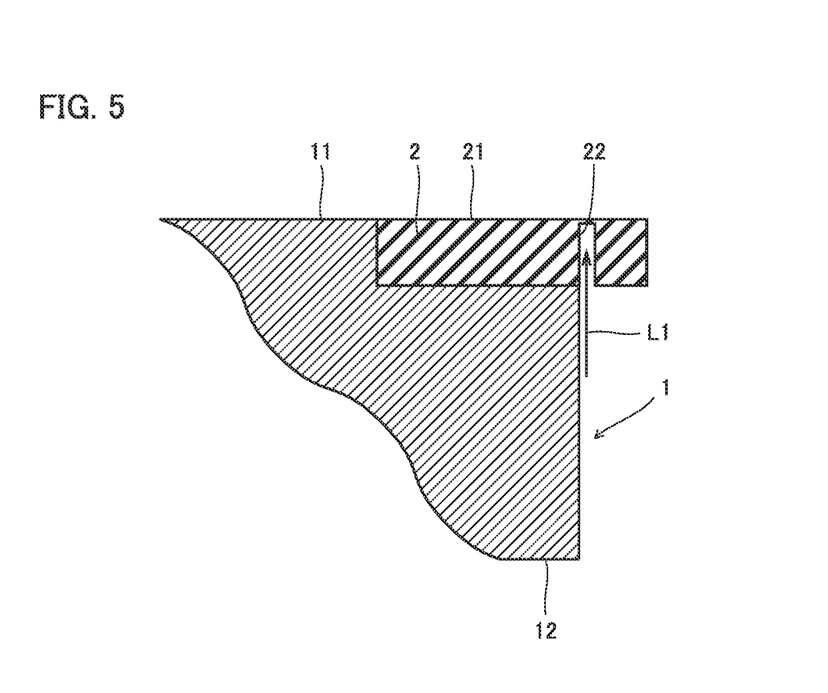
FIG. 5 is a cross-sectional view of the cutting tool according to the embodiment in a cutting edge forming step S2.

FIG. 5 is a cross-sectional view of the cutting tool according to the embodiment in cutting edge forming step S2. As shown in FIG. 5, in cutting edge forming step S2, flank face 22 and cutting edge 23 are formed. Flank face 22 and cutting edge 23 are formed by applying a laser L1 to diamond single crystal material 2. In cutting edge forming step S2, laser L1 is applied from the side of a face opposite to rake face 21 (more specifically, from the side of rear surface 12 to the side of top surface 11). In cutting edge forming step S2, with the object of further suppressing the occurrence of cracking or chipping in the vicinity of cutting edge 23 when a portion machined by laser L1 reaches rake face 21 of diamond single crystal material 2, it is preferable that laser L1 be defocused (laser L1 be applied to diamond single crystal material 2 while being least focused on diamond single crystal material 2).

In cutting edge forming step S2, laser L1 has a pulse width of $1\times10^{-12}$ seconds or less. In cutting edge forming step S2, laser L1 preferably has a pulse width of $1\times10^{-15}$ seconds or more. Stated from another perspective, the machining with laser L1 in cutting edge forming step S2 is performed in an ablation mode instead of a thermal mode.

Laser L1 used in cutting edge forming, step S2 preferably has a wavelength of 1064 nm or less. Laser L1 used in cutting edge forming step S2 more preferably has a wavelength of 512 nm or less. As the wavelength of laser L1 decreases, the absorptivity of diamond single crystal material 2 increases, thus allowing for stable machining. Laser L1 used in cutting edge forming step S2 is, for example, a $YVO_4$ laser, a Nd:YAG laser, or a double harmonic thereof.

Figure 6:
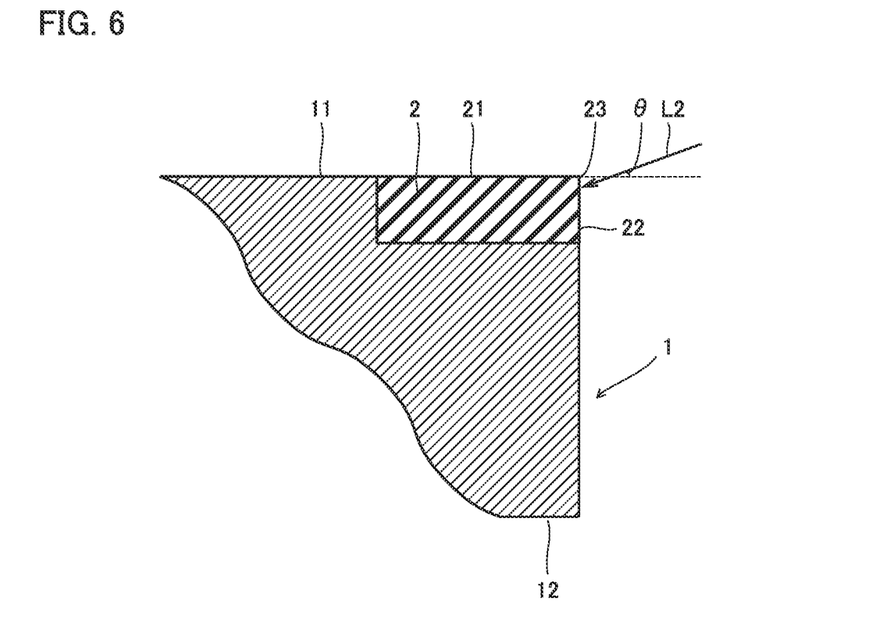
FIG. 6 is a cross-sectional view of the cutting tool according to the embodiment in a flank face irradiation step S1.

FIG. 6 is a cross-sectional view of the cutting tool according to the embodiment in flank face irradiation step S3. As shown in FIG. 6, in flank face irradiation step S3, a laser L2 is applied to diamond single crystal material 2 along cutting edge 23 from the side of flank face 22.

In flank face irradiation step S3, laser L2 has a pulse width of $1\times10^{-12}$ seconds or less. In flank face irradiation step S3, laser L2 preferably has a pulse width of $1\times10^{-15}$ seconds or more. Stated from another perspective, the machining with laser L2 in flank face irradiation step S3 is performed in an ablation mode instead of a thermal mode. In flank face irradiation step S3, laser L2 has a peak output of less than 1 W. The peak output of laser L2 is a value obtained by dividing energy per pulse of laser L2 by the pulse width of laser L2.

In flank face irradiation step S3, the application direction of laser L2 and rake face 21 form an angle θ. When rake face 21 is formed of the {100} plane of diamond single crystal material 2, angle θ is preferably −35° or more and 35° or less.

When rake face 21 is formed of the {110} plane of diamond single crystal material 2, angle θ is preferably −35° or more and 35" or less. In this case, angle θ may be −89° or inure and −38° or less, or 38° or more and 89° or less.

It should be noted that angle θ is positive when, with rake face 21 facing upward and flank face 22 facing rightward, the application direction of laser L2 is rotated counterclockwise relative to rake face 21. Angle θ is negative when, with rake face 21 facing upward and flank face 22 facing rightward, the application direction of laser L2 is rotated clockwise relative to rake face 21.

Laser L2 used in flank face irradiation step S3 preferably has a wavelength of 1064 nm or less. Laser L2 used in flank face irradiation step S3 more preferably has a wavelength of 512 nm or less. As the wavelength of laser L2 decreases, the absorptivity of diamond single crystal material 2 increases, thus allowing for stable machining. Laser L2 used in flank face irradiation step S3 is, for example, a $YVO_4$ laser, a Nd:YAG laser, or a double harmonic thereof.

Figure 7:
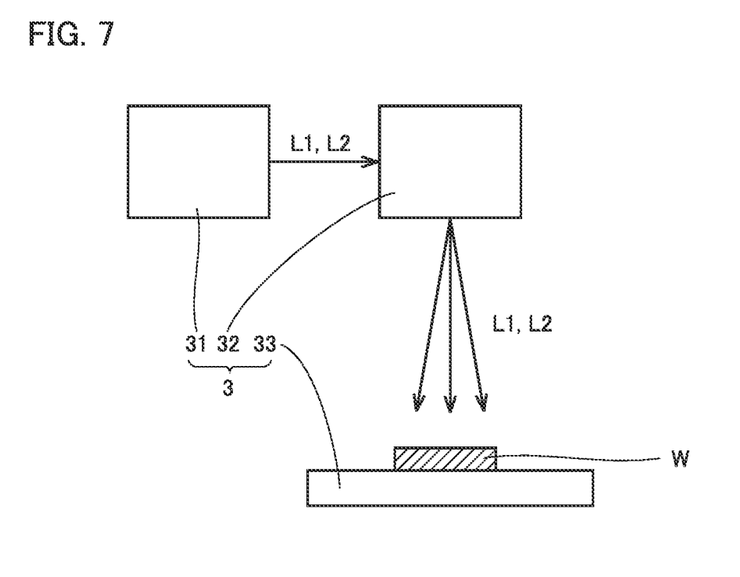
FIG. 7 is a schematic diagram showing the structure of a machining apparatus 3 for use in the method for manufacturing the cutting tool according to the embodiment.

FIG. 7 is a schematic diagram showing the structure of a machining apparatus 3 for use in the method for manufacturing the cutting tool according to the embodiment. As shown in FIG. 7, machining apparatus 3 for use in the method for manufacturing the cutting tool according to the embodiment has a laser light source 31, a scanner head 32, and a machining stage 33.

Laser light source 31 supplies laser L1 and laser L2 to scanner head 32.

Machining stage 33 has a workpiece W placed thereon. Workpiece W is the cutting tool according to the embodiment described above. Scanner head 32 scans laser L1 and laser L2 supplied from laser light source 31 over a surface of workpiece W. Scanner head 32 is a galvanometer scanner, for example. Cutting edge forming step S2 and flank face irradiation step S3 are performed using machining apparatus 3, for example.

While fixing step S1 was described above as being performed prior to cutting edge forming step S2 and flank face irradiation step S3, fixing step S1 may be performed subsequent to cutting edge forming step S2 and flank face irradiation step S3.

While laser L1 was described above as being applied from the side of the face opposite to rake face 21 in cutting edge forming step S2, laser L1 may be applied from the side of rake face 21 when flank face irradiation step S3 is performed. When laser L1 is applied from the face opposite to rake face 21 in cutting forming step S2, flank face irradiation step S3 may not be performed. With the object of improving dimensional accuracy of cutting edge 23 relative to base material 1, and preventing cracking or chipping from remaining in cutting edge 23, it is most preferable to perform fixing step S1 first, then cutting edge forming step S2 (apply laser L1 from the face opposite to rake face 21), and then flank face irradiation step S3.

(Effect of Method for Manufacturing Cutting Tool According to Embodiment)

The effect of the cutting tool according to the embodiment is now described.

First, the effect obtained by applying laser L1 from the side of the face opposite to rake face 21 in cutting edge forming step S2 is described. When applying laser L from the side of rake face 21 in cutting edge forming step S2, there is a risk of occurrence of cracking or chipping in the vicinity of cutting edge 23. This is because diamond single crystal material 2 has low absorptivity for laser L1 and is thus unstable unstable to laser machining, thereby possibly generating sparks (small explosion) during the machining.

A portion of diamond single crystal material 2 that is irradiated with laser L1 is partially graphitized. The graphitized portion of diamond single crystal material 2 has increased absorptivity for laser L1. Accordingly, as the machining with laser L1 progresses and so does the graphitization of the portion near the location where laser L1 is applied, that portion becomes more stable to the machining with laser L1 and less likely to generate sparks, so that cracking or chipping of diamond single crystal material 2 is less likely to occur.

When laser L1 is applied from the side of the face opposite to rake face 21 in cutting edge forming step S2, cutting edge 23 is formed immediately before the end of cutting edge forming step S2. Thus, at the time of formation of cutting edge 23, the portion of diamond single crystal material 2 that is irradiated with laser L1 has been graphitized. When laser L1 is applied from the side of the face opposite to rake face 21 in cutting edge forming step S2, therefore, cracking or chipping is less likely to occur at the time of formation of cutting edge 23. That is, when laser L1 is applied from the side of the face opposite to rake face 21 in cutting edge forming step S2, cracking or chipping can be prevented from remaining in the diamond single crystal material after the laser machining.

Laser L1 is most focused at its focal point, and diverges as the distance from the focal point increases. When laser L1 is applied from the side of rake face 21 in cutting edge forming step S2, the machining with laser L1 progresses to dig through diamond single crystal material 2 from rake face 21 to the face opposite to rake face 21. On this occasion, the diverged portion of laser L1 is applied in the vicinity of cutting edge 23. As a result, when laser L1 is applied from the side of rake face 21 in cutting edge forming step S2, the sharpness of cutting edge 23 is compromised (radius of curvature R of cutting edge 23 is increased).

When laser L1 is applied from the side of the face opposite to rake face 21 in cutting edge forming step S2, the machining with laser L1 progresses to dig through diamond single crystal material 2 from the face opposite to rake face 21 to rake face 21. Thus, a particularly focused portion of laser L1 is applied in the vicinity of cutting edge 23. When laser L1 is applied from the side opposite to rake face 21 in cutting edge forming step S2, therefore, sharp cutting edge 23 (having small radius of curvature R) can be obtained.

When laser L1 is defocused when the portion machined by laser L1 reaches rake face 21 in cutting edge forming step S2, the diverged portion of laser L1 is applied in the vicinity of cutting edge 23. When laser L1 is applied from the side of the face opposite to rake face 21, however, the application direction of laser L1 is opposite to that of laser L1 applied from the side of rake face 21, and therefore, the effect of the divergence of laser L1 is also opposite (the divergence of laser L1 acts to increase the sharpness of cutting edge 23). Therefore, even if laser L1 is defocused when the portion machined by laser L1 reaches rake face 21 in cutting e forming step S2, sharp cutting edge 23 can be obtained.

Next, the effect obtained by performing flank face irradiation step S3 is described. In flank face irradiation step S3, laser L2 is applied to diamond single crystal material 2 along cutting edge 23 from the side of flank face 22. Since laser L2 has a pulse width of $1 \times 10^{-12}$ seconds or less, ablation of diamond single crystal material 2 occurs due to the application of laser L2. Even if cracking or chipping occurs in the vicinity of cutting edge 23 in cutting edge forming step S2, that cracking or chipping is removed by this ablation. Since laser L2 has a peak output of less than 1 W, cracking or chipping is less likely to occur during the application of laser L2 in flank face irradiation step S1. Thus, when flank face irradiation step S3 is performed, cracking or chipping can be prevented from remaining in the diamond single crystal material after the laser machining.

When rake face 21 is formed of the {100} plane of diamond single crystal material 2, and angle θ is −52° or more and 52° or less, the application direction of laser L2 and a cleavage direction of diamond single crystal material 2 intersect each other. Thus, in this case, the cleavage of diamond single crystal material 2 after the machining with laser L2, associated with the application of laser L2, can be suppressed. This is also the case when rake face 21 is formed of the {110} plane of diamond single crystal material 2, and angle θ is −35° or more and 35° or less, −89° or more and −38° or less, or 38° or more and 89° or less.

The impurity contained in diamond single crystal material 2 has higher laser absorptivity than diamond single crystal material 2. There is a risk of occurrence of cracking or chipping at the location within diamond single crystal material 2 where the impurity is contained, due to the change in laser absorptivity. When the concentration of the impurity contained in diamond single crystal material 2 is less than 600 ppm, the occurrence of such cracking or chipping can be suppressed.

As the nitrogen concentration in diamond single crystal material 2 increases, wear resistance and fracture resistance of diamond single crystal material 2 are improved. When the nitrogen concentration in diamond single crystal material 2 becomes excessive, however, material bond in diamond single crystal material 2 becomes brittle. As a result, cracking or chipping tends to occur during the laser machining. For this reason, when the nitrogen concentration in diamond single crystal material 2 is 20 ppm or more and 70 ppm or less, the wear resistance and fracture resistance of diamond single crystal material 2 can be improved while the occurrence of cracking or chipping of diamond single crystal material 2 after the laser machining is suppressed.

In addition, by containing nitrogen in diamond single crystal material 2, the absorptivity of diamond single crystal material 2 for laser of longer wavelength is improved. As a result, when diamond single crystal material 2 contains nitrogen, the laser machining can be stabilized.

When the impurity contained in diamond single crystal material 2 does not provide conductivity to diamond single crystal material 2, it is difficult to perform electric discharge machining on diamond single crystal material 2. According to the method for manufacturing the cutting tool in accordance with the embodiment, cracking or chipping can be prevented from remaining even if it is difficult to perform electric discharge machining.

When fixing step S1 is performed prior to cutting edge forming step S2 and flank face irradiation step S3, cutting edge 23 is not positionally displaced subsequent to cutting edge forming step S2 and flank face irradiation step S3. In this case, therefore, cutting edge 23 can be formed with high form accuracy.

It should be understood that the embodiment disclosed herein is illustrative and non-restrictive in every respect. The scope of the present disclosure is defined by the terms of the claims, rather than the embodiment above, and is intended to include any modifications within the scope and meaning equivalent to the terms of the claims.

REFERENCE SIGNS LIST 1 base material; 2 diamond single crystal material; 3 machining apparatus; 11 top surface; 12 rear surface; 13 attachment portion; 21 rake face; 22 flank face; 23 cutting edge; 31 laser light source; 32 scanner head; 33 machining stage; L1, L2 laser; R radius of curvature; Ra arithmetic average roughness; S1 fixing step; S2 cutting edge forming step; S3 flank face irradiation step; W workpiece.

The invention claimed is:

1. A method for manufacturing a cutting tool, the cutting tool comprising a base material and a diamond single crystal material fixed to the base material, the diamond single crystal material having a rake face, a flank face continuous with the rake face, and a cutting edge formed by a ridgeline serving as a boundary between the rake face and the flank face, the method comprising:
a flank face irradiation step of applying a laser to the diamond single crystal material along the cutting edge from a side of the flank face,
the laser having a peak output of less than 1 W and a pulse width of $1\times10^{-12}$ seconds or less in the flank face irradiation step.

2. The method for manufacturing a cutting tool according to claim 1, wherein
the diamond single crystal material contains an impurity, and
concentration the impurity in the diamond single crystal material is less than 600 ppm.

3. The method for manufacturing a cutting tool according to claim 2, wherein
the impurity is nitrogen, and
nitrogen concentration in the diamond single crystal material is 20 ppm or more and 70 ppm or less.

4. The method for manufacturing a cutting tool according to claim 1, further comprising:
a cutting edge forming step of forming the cutting edge by applying a laser to the diamond single crystal material from a side of a face opposite to the rake face, wherein
the laser has a pulse width of $1\times10^{-12}$ seconds or less in the cutting edge forming step.

5. The method for manufacturing a cutting tool according to claim 1, further comprising:
a fixing step of fixing the diamond single crystal material to the base material, wherein
the fixing step is performed prior to the flank face irradiation step.

6. The method for manufacturing a cutting tool according to claim 1, wherein
the rake face is formed of a {100} plane of the diamond single crystal material, and
an application direction of the laser in the flank face irradiation step and the rake face form an angle of $-52°$ or more and $52°$ or less.

7. The method for manufacturing a cutting tool according to claim 1, wherein
the rake face is formed of a {110} plane of the diamond single crystal material, and
an application direction of the laser in the flank face irradiation step and the rake face form an angle of $-35°$ or more and $35°$ or less, $-89°$ or more and $-38°$ or less, or $38°$ or more and $89°$ or less.

8. A method for manufacturing a cutting tool, the cutting tool comprising a base material and a diamond single crystal material fixed to the base material, the diamond single crystal material having a rake face, a flank face continuous with the rake face, and a cutting edge formed by a ridgeline serving as a boundary between the rake face and the flank face, the method comprising:
a cutting edge forming step of forming the cutting edge by applying a laser to the diamond single crystal material from a side of a face opposite to the rake face,
the laser having a pulse width of $1\times10^{-12}$ seconds or less in the cutting edge forming step.

* * * * *